Sept. 3, 1935.  A. H. RINEY  2,013,254

PROTECTOR FOR PLAIN END PIPES

Filed Nov. 2, 1931

Inventor
A. H. Riney
By Robt. E. Barry
Attorney

Patented Sept. 3, 1935

2,013,254

UNITED STATES PATENT OFFICE 2,013,254

PROTECTOR FOR PLAIN END PIPES

Arthur H. Riney, Bartlesville, Okla., assignor to Phillips Petroleum Company, Bartlesville, Okla., a corporation of Delaware Application November 2, 1931, Serial No. 572,683

9 Claims. (Cl. 137—91)

This invention relates to improvements in means for sealing and protecting the ends of metal pipes or tubes.

In the manufacture, shipping, handling, laying, and use of plain end pipes, bell and spigot pipes, specially prepared pipes for joints other than internal screw, and all tubular products not having internal screw joints, for and by the various industries for handling of liquids or gases, the pipes are liable to injury through deformation of the ends by weight or physical impact, where the joint must be made by welding, clamping, or by the use of sleeve couplings. This necessitates the repairing of pipe so that the joints may be made satisfactorily, by either making the ends perfectly round, or cutting off a length of the pipe. Also, the open ends of the pipe allow the accumulation of foreign matter, dirt, sand, mud, splinters, rocks, and all debris within the pipe during shipping, handling, or laying; especially during the latter operation, when the pipe is allowed to lay for some time on the ground or in a ditch, exposed to the elements and surface water drainage. Pipe is usually cleaned at the mill, and it is necessary that the pipe be kept clean until ready for its contents, especially in the event of its use for transporting petroleum refined products, such as gasoline, when contaminative matter must be eliminated. Moreover, the accumulation of moisture within the pipe stimulates the progress of corrosion and rust formation, with the result of further fouling of the inside surface of the pipe.

The primary object of the present invention is to overcome these disadvantages, and in accordance with my invention, a protector sealer is inserted in each end of the pipe or tube at the factory or mill, as soon as the pipe or tube is manfactured, and such protector sealers, will prevent the deformation out of round of the ends, and will keep out contaminating or foreign matter by sealing the ends of the pipe or tube.

In the design, manufacture and application of sealers or protectors for pipes or tubes for the purpose of sealing out moisture, dirt, and foreign matter of all description, provision must be made for making a tight joint between the said sealer or protector and the pipe or tube wall. The arrangement made to provide this sealing feature must be such that it will also provide for rigidity to prevent accidental removal, a perfectly water tight joint, and easy removal by special and intentional effort.

A further object of the invention is to provide a sealer or protector for pipes or tubes, a portion of which may be intentionally bent or deformed in such a manner as to squeeze a gasket between the protector and the inner surface of the pipe to give the maximum amount of protection against foreign matter or water getting into the pipe or tube, and also provide friction to prevent accidental removal.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
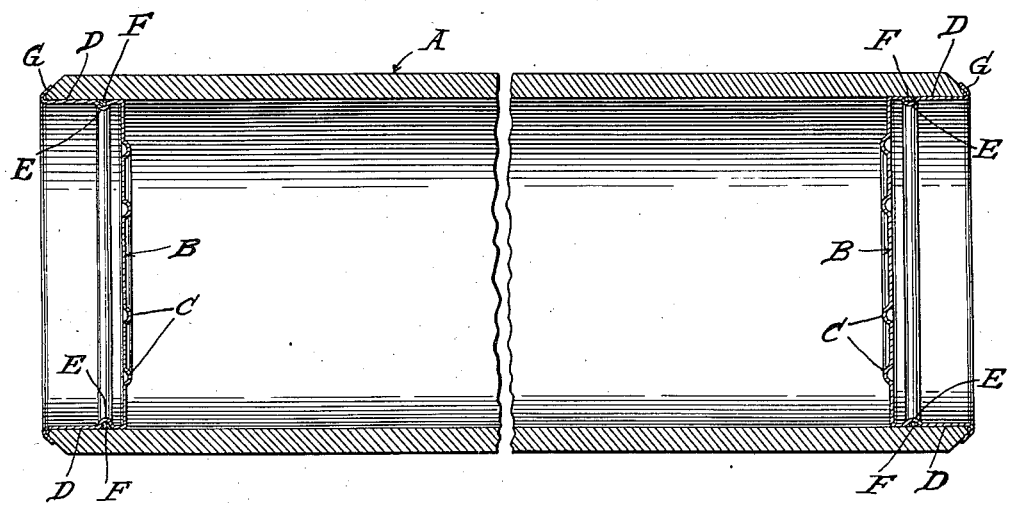
Fig. 1 is a longitudinal sectional view of a pipe or tube, the ends of which are protected and sealed by a pair of my improved protectors.
Figure 2:
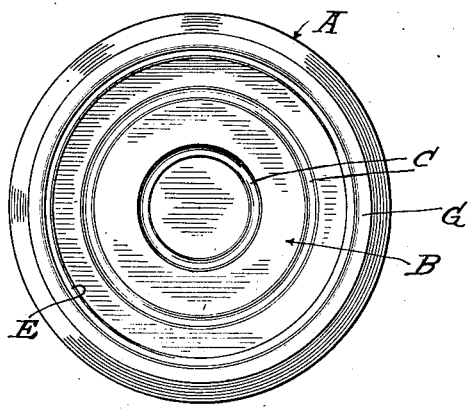
Fig. 2 is an end view of the same.

Referring to the drawing, A designates a rigid metal pipe of the kind employed for the transportation of gasoline or the like. One of my improved sealers or protectors is provided for each end of the pipe, and while such protectors may be made of any suitable material, I prefer to make the same of pressed steel. Each protector comprises a back or disk B which is deformed as shown at C, for maximum strength. Extending outwardly from the disk is a neck or ring D, preferably of cylindrical shape so that it may snugly and frictionally engage the inner surface of the pipe. The neck or ring D is stamped or otherwise constructed to provide an external groove or recess E which is adapted to receive an annular gasket F of rubber or other resilient material, for the purpose hereinafter described.

An outwardly extending flange G is integral with the outer end of the neck, and extends partially over the end of the pipe.

The groove or recess E in the cylindrical wall D may be located at any point along said wall intermediate the flange G and the disk B, but I prefer to place the same only a short distance away from the disk B in order that the neck D may project outwardly a sufficient distance to allow the hooks to be placed in the ends of the pipe for handling the latter, without coming in contact with the recess or shoulder E.

The flange G not only strengthens the protector and protects the extremity of the pipe, but it acts in a measure to seal the ends of the pipe. The flange further functions as a means to facilitate the removal of the protector from the pipe by the use of a bar or any special device embodying the principle of levers or rolling wheels.

After the pipe is manufactured, a pair of my protectors or sealers are attached to the ends thereof after placing a gasket of rubber or other suitable material in the groove or recess E, which has been provided for that purpose. The wall of the recess E is then flattened or expanded by any suitable tool so as to compress the rubber gasket tightly against the pipe or tube walls and so as to frictionally engage the pipe wall, thus holding the sealer in place and at the same time sealing out all water or foreign matter by the perfect water tight joint. The left hand portion of Fig. 1 shows the protector sealer attached to the pipe end and before the wall of the groove E has been deformed, while the right hand portion of Fig. 1 shows the protector sealer after the groove has been deformed, and with the rubber gasket flattened and snugly and frictionally engaging the inner walls of the pipe.

From the above description it will be evident that I have devised a novel protector which will not only save a pipe end from battering and distortion, seal the pipe end to protect the interior of the latter, but one which will be rigidly secured in position by the compression of the gasket against the pipe or tube walls.

From the foregoing it is believed that the construction and advantages of the invention may be readily understood, and it is manifest that changes may be made in the details disclosed, without departing from the spirit of the invention, as expressed in the claims.

What I claim and desire to secure by Letters Patent is:

1. The combination with a pipe, of protectors sealing the ends of the pipe, each protector comprising a rigid back deformed for maximum strength and arranged within the pipe, a neck engaging the interior surface of the pipe and projecting outwardly from said back, and sealing means interposed between said neck and the inner surface of said pipe for holding the protector in said pipe.

2. The combination with a pipe, of protectors sealing the ends of the pipe, each protector comprising a rigid back arranged within the pipe, a neck engaging the inner surface of the pipe and projecting outwardly from said back, a groove in said neck, and sealing means cooperating with said groove for retaining the protector within the pipe.

3. The combination with a pipe, of protectors sealing the ends of the pipe, each protector comprising a rigid back arranged within the pipe, a neck engaging the inner surface of the pipe and projecting outwardly from said back, a groove in said neck, and a rubber gasket cooperating with said groove and the inner surface of said pipe for retaining the protector within the pipe.

4. The combination with a pipe, of protectors sealing the ends of the pipe, each protector comprising a rigid back arranged within the pipe, a neck engaging the inner surface of the pipe and projecting outwardly from said back, the outer end of said neck forming a flange for snugly engaging the outer end of the pipe, a deformable wall forming a groove in said neck, and means cooperating with said groove when said wall is deformed for engaging the inner surface of said pipe and thereby retaining the protector in position within the pipe.

5. The combination with a pipe, of protectors sealing the ends of the pipe, each protector comprising a neck having a rigid back at one end thereof arranged within the pipe, and a flange at its outer end engaging the outer end of said pipe, a deformable wall forming part of said neck and providing a groove arranged intermediate the ends of said neck, and resilient distorted packing means within said groove and engaging the inner surface of said pipe for retaining the protector in position.

6. The combination with a metal pipe, of rigid metallic protecting caps mounted on and sealing the ends of the pipe against the entrance of water, each cap having a substantially cup-shaped portion projecting into the pipe for a sufficient distance to form a hook receiving cavity, the cup-shaped portion of each cap including a reinforcing disk from which projects a cylindrical wall having its outer surface snugly engaging the inner surface of the pipe, the outer end of said cylindrical wall forming a flange for snugly engaging the outer end of the pipe, an external groove in said cylindrical wall adapted to receive a rubber gasket, the grooved portion of the wall being deformable, and a rubber gasket cooperating with said groove when the wall is deformed to engage the inner surface of said pipe and retain said protecting cap in snug engagement with said pipe.

7. In combination with a cylindrical member, a closure therefor comprising a sheet metal cup fitted into the end of the cylindrical member, said cup having an annular groove in its outer wall, and a rubber gasket mounted in said groove, the metal behind said groove being expanded outwardly, whereby the gasket is compressed to seal the closure, and the metal of the cup adjacent the groove being likewise expanded to grip the wall of the cylindrical member.

8. In combination with a cylindrical member, a closure therefor comprising a sheet metal cup fitted into the end of the cylindrical member, said cup having a circular corrugation in its side wall, a gasket mounted therein, said corrugation being expanded outwardly, whereby the gasket seals the joint between the cylindrical member and cup, the metal of the cup wall adjacent to said corrugation being likewise expanded to tightly grip the interior wall of the cylindrical member.

9. In combination with a pipe, a closure therefor comprising a sheet metal cup fitted into an end of the pipe, the cup including a rigid reinforcing disc deformed for maximum strength and arranged within the pipe to prevent the end of the pipe from being deformed in transit, the cup also including a cylindrical wall having its outer surface snugly engaging the inner surface of the pipe, the outer end of the wall forming a flange engaging an end edge of the pipe, said wall having an annular groove, a gasket positioned in the groove and engaging the inner surface of the pipe, the metal behind said groove being expanded outwardly, whereby the gasket is compressed to seal the closure, and the metal of the cup adjacent the groove being likewise expanded to more firmly engage the wall of the pipe.

ARTHUR H. RINEY.